Figure 5:
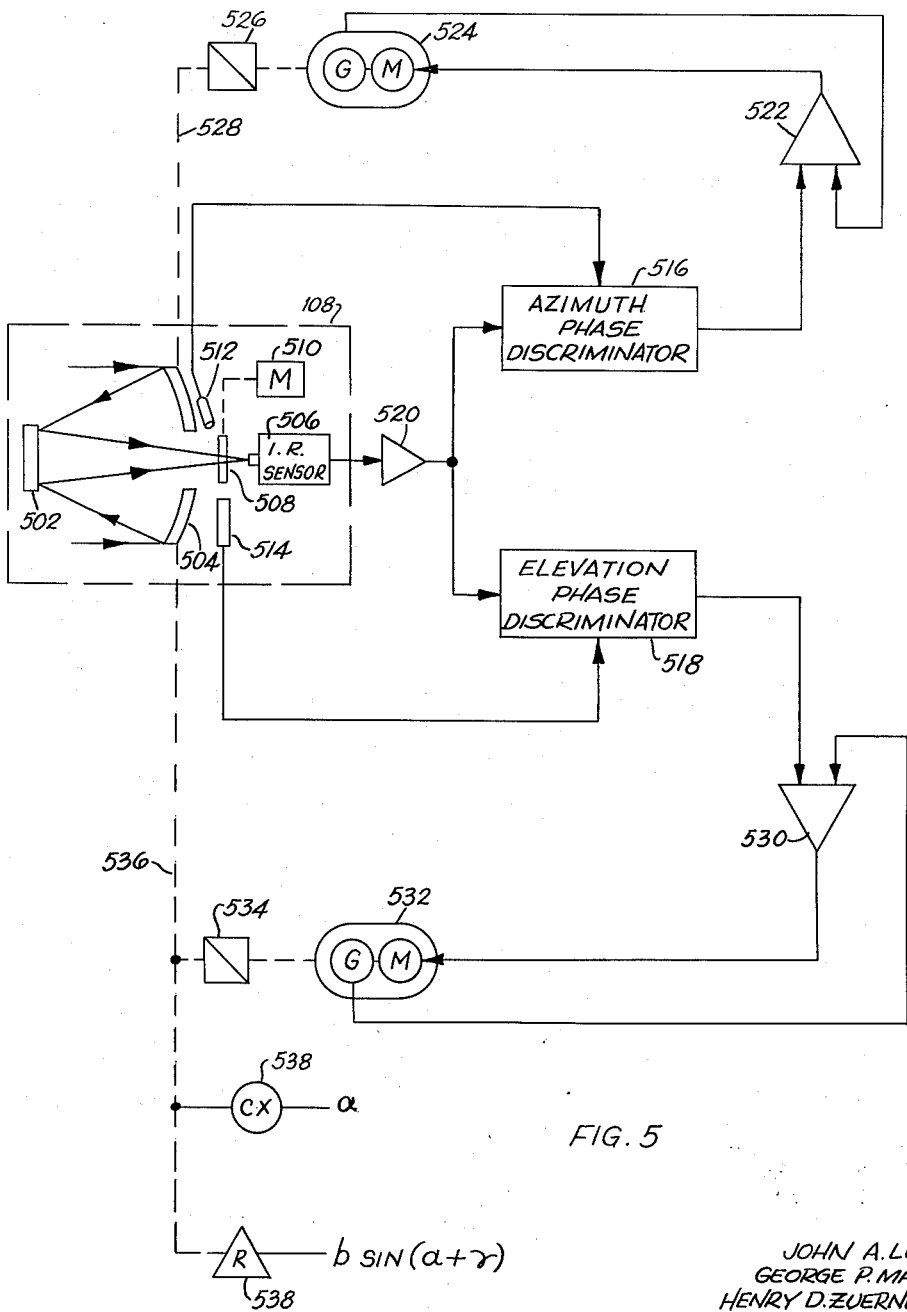

Oct. 10, 1961
J. A. LUNDIN ET AL
3,003,451
MIRROR LANDING SYSTEM
Filed Sept. 10, 1959
5 Sheets-Sheet 1
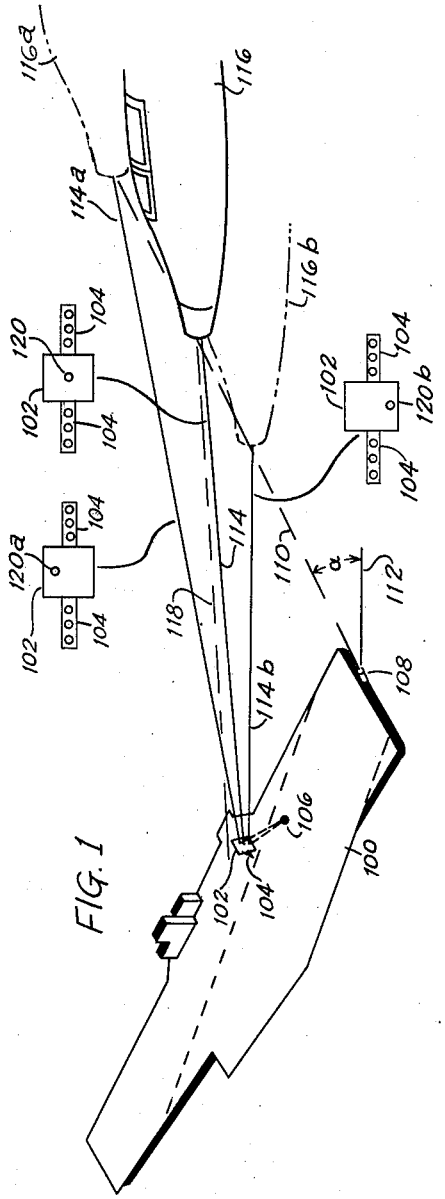
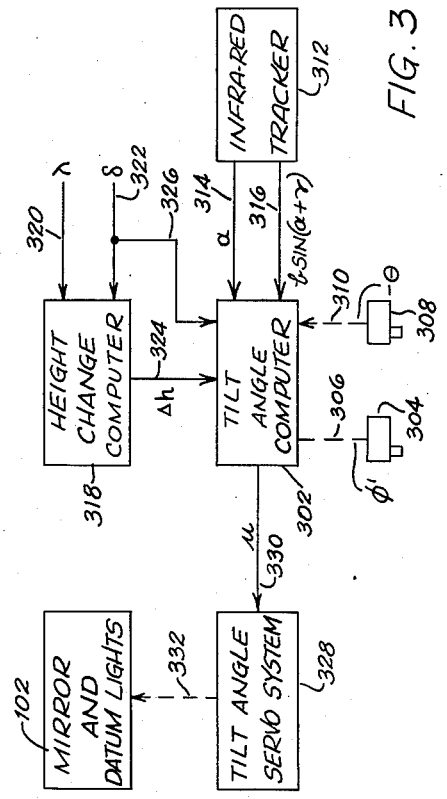
JOHN A. LUNDIN
GEORGE P. MASELLI
HENRY D. ZUERNDORFER
INVENTORS
BY Andrew L. Bain
George J. Seligsohn
ATTORNEYS Oct. 10, 1961  J. A. LUNDIN ET AL  3,003,451
MIRROR LANDING SYSTEM
Filed Sept. 10, 1959  5 Sheets-Sheet 2
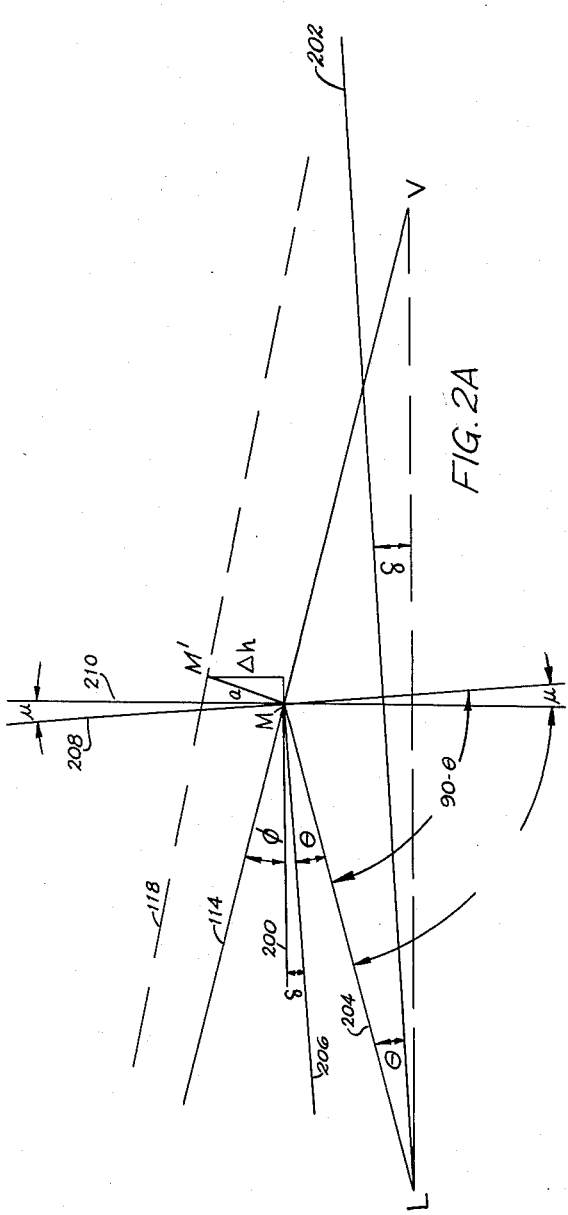
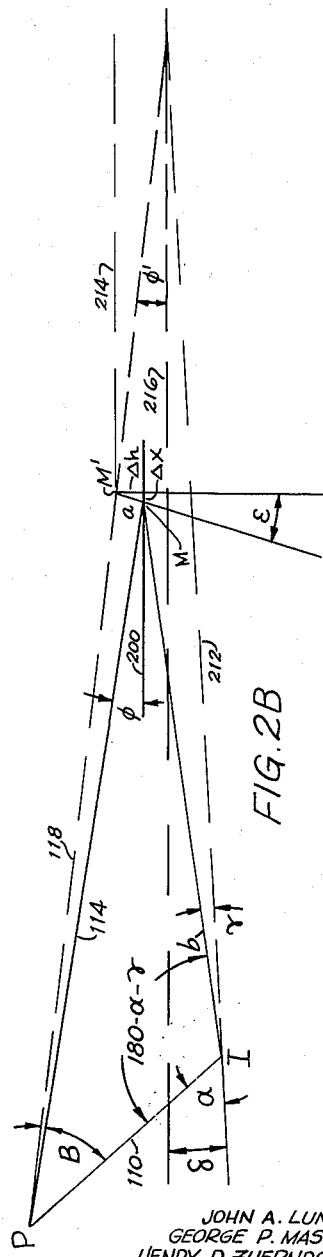
JOHN A. LUNDIN
GEORGE P. MASELLI
HENRY D. ZUERNDORFER
INVENTOR.
BY Andrew L. Bain
George J. Seligsohn
ATTORNEYS

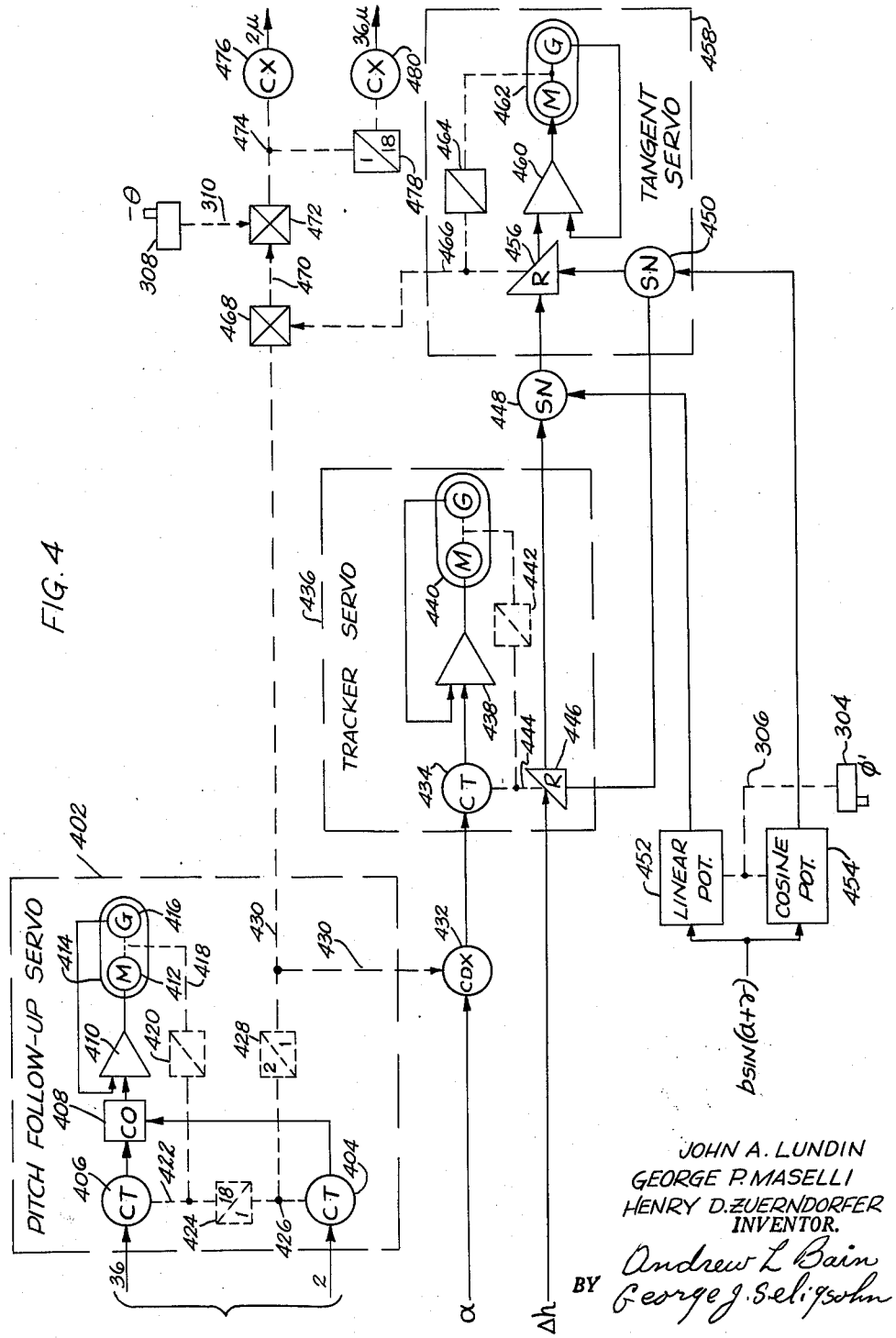

JOHN A. LUNDIN
GEORGE P. MASELLI
HENRY D. ZUERNDORFER
INVENTOR.

BY Andrew L. Bain
George J. Seligsohn

ATTORNEYS

United States Patent Office 3,003,451
Patented Oct. 10, 1961

3,003,451
MIRROR LANDING SYSTEM
John A. Lundin, Madison, George P. Maselli, Dumont, and Henry D. Zuerndorfer, Pompton Plains, N.J., assignors to General Precision Inc., a corporation of Delaware
Filed Sept. 10, 1959, Ser. No. 839,241
5 Claims. (Cl. 114—43.5)

This invention relates to mirror landing systems for aircraft and, more particularly, to a novel mirror landing system including stabilization means.

Mirror landing systems for aircraft, which are well known in the art, may be used both on land and sea to aid an aircraft in landing along a predetermined glide path. However, they are particularly suited for use in landing an aircraft on the deck of a ship, such as an aircraft carrier.

Briefly, present day mirror landing systems comprise a plane mirror located on the deck of a ship facing a landing aircraft. On either side of the mirror are datum lights oriented midway between the top and bottom of the mirror which also face the aircraft. A source of light located on the deck of the ship is directed toward the mirror and reflected therefrom. Assuming that the ship is not subject to pitch, roll or heave, the angle of incidence of the source light is such that the virtual image thereof, as seen from the aircraft, will appear at the center of the mirror, midway between the datum lights and in line therewith, only if the aircraft is on a predetermined glide path. If the aircraft should be above the predetermined glide path, the virtual image will appear above the datum lights, and if the aircraft should be below the predetermined glide path, the virtual image will be below the datum lights.

However, the ship is, in fact, very much subject to pitch, roll and heave. Therefore the virtual image, as seen from the aircraft, appears to dance about a point above, below or in line with the datum lights, as the case may be. This seriously reduces the effectiveness of present day mirror landing systems.

One proposed arrangement for overcoming this problem is to maintain the mirror relatively fixed in space. In order to accomplish this it is necessary to mount the mirror on an elevator which is moved in response to pitch, roll and heave. This solution is not too practical, since it involves structural changes in an aircraft carrier. Furthermore, due to the large inertia of such an elevator, it is doubtful that it would effectively accomplish its purpose.

The present invention contemplates a relatively simple arrangement for automatically tilting the mirror in accordance with pitch, roll and heave in such a manner that the virtual image, as seen from the aircraft, remains centered between the datum lights, if the aircraft is on the predetermined glide path, despite such pitch, roll and heave.

It is therefore an object of the present invention to provide an improved mirror landing system.

It is a further object of this invention to provide a mirror landing system incorporating stabilization means.

It is a still further object of this invention to provide automatic means for tilting the mirror of a mirror landing system.

It is one feature of the present invention to provide an infrared tracking system for determining the elevation angle between the deck of the aircraft carrier and a landing aircraft.

It is another feature of the present invention to provide a computer for producing an output manifesting the mirror tilt angle in response to an input from the tracking system manifesting elevation angle and other inputs from the ship's gyros manifesting pitch and roll.

Figure 6:
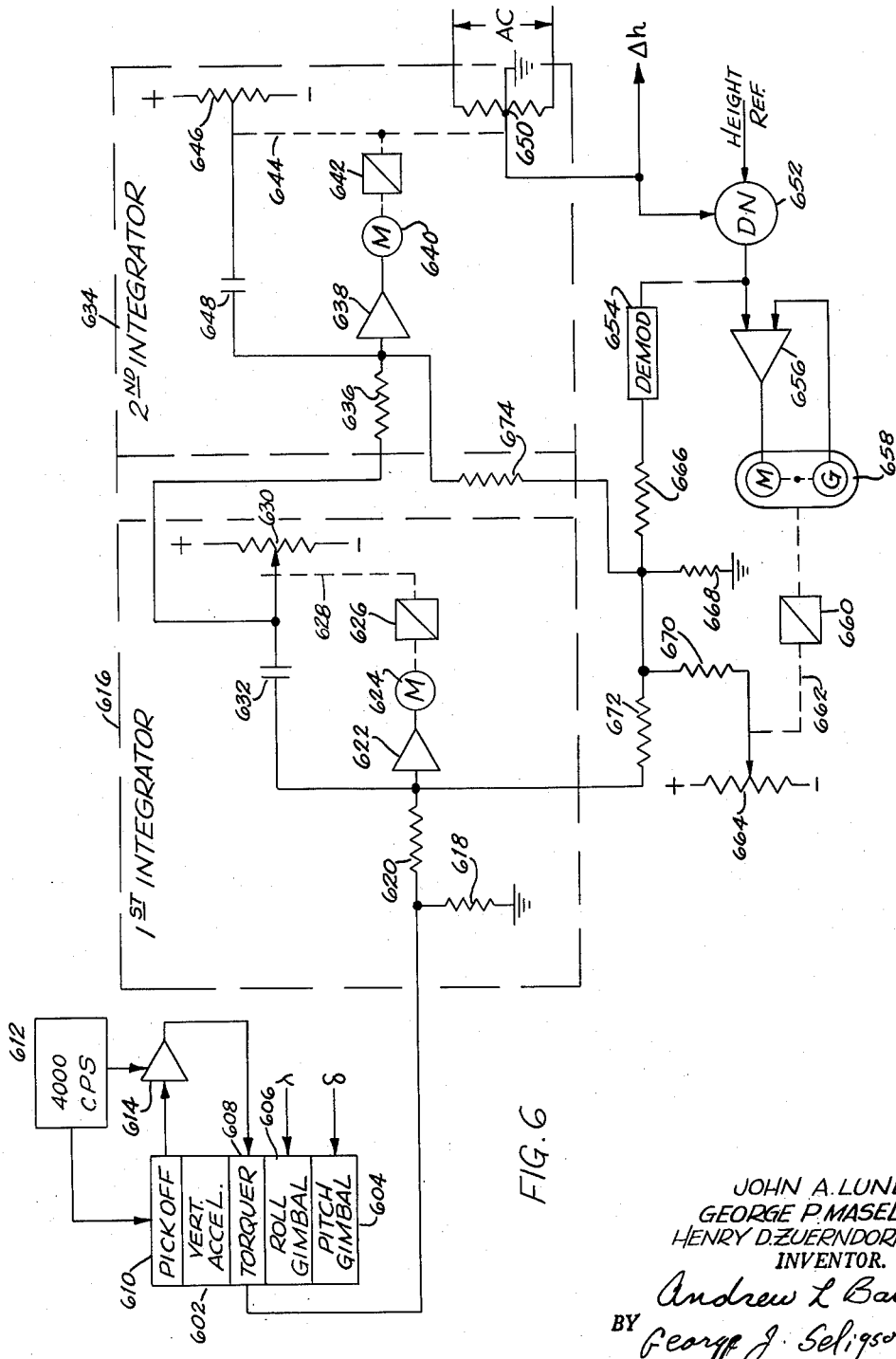

These and other objects, features and advantages of the present invention will become apparent from the following detailed description taken together with the accompanying drawing, in which:

FIG. 1 is a diagram of an aircraft carrier and landing aircraft utilizing the mirror landing system of this invention, FIGS. 2A and 2B illustrate the geometric relationships which exist in this mirror landing system, FIG. 3 is a block diagram of the major components of the mirror landing system, FIG. 4 is a block diagram of the tilt angle computer of FIG. 3, FIG. 5 is a block diagram of the infra-red tracker of FIG. 3, and FIG. 6 is a block and schematic diagram of the height change computer of FIG. 3.

Referring now to FIG. 1, there is shown an aircraft carrier 100. Mounted on the deck of aircraft carrier 100 is mirror 102 with datum lights 104 and light source 106. The light from source 106 is reflected from mirror 102. Light source 106 is oriented at a fixed angle with respect to the deck of aircraft carrier 100. However, the angle of incidence, as well as the angle of reflection, is varied by the tilt angle of mirror 102.

Infra-red sensing device 108, located just under the deck at the bow of aircraft carrier 100, provides information as to the value of angle $\alpha$ between track line 110 and line 112 parallel to the deck of aircraft carrier 100. Angle $\alpha$ along with pitch and roll information obtained from the gyros of aircraft carrier 100 are used to tilt mirror 102 to such an angle that the line of sight 114 from landing aircraft 116 to the virtual image of light source 106 passes through the center of mirror 102 only when landing aircraft 116 is located at the intersection of tracking line 110 and predetermined glide path 118.

In this case, as shown in FIG. 1, virtual image 120 of light source 106 appears in line with datum lights 104 and midway therebetween.

Should the landing aircraft be located on tracking line 110 above the intersection thereof with predetermined glide path 118, as shown at 116a of FIG. 1, the line of sight 114a from aircraft 116a to the virtual image of light source 106 will pass through mirror 102 above the center thereof. Therefore, as shown in FIG. 1, virtual image 120a appears above datum lights 104.

In a similar manner, should the landing aircraft be located on tracking line 110 below the intersection thereof with predetermined glide path 118, as shown at 116b of FIG. 1, the line of sight from aircraft 116b to the virtual image of light source 106 will pass through mirror 102 below the center thereof. Therefore, as shown in FIG. 1, virtual image 120b appears below datum lights 104.

FIGS. 2A and 2B show the geometric relationships which exist in determining the mirror tilt angle $\mu$.

In FIGS. 2A and 2B, M represents the actual position of the center of mirror 102, M' represents the position the center of the mirror would have if there were zero pitch, roll and heave, $a$ represents the fixed distance between M and M', $\Delta h$ represents the vertical component of $a$, line 114 represents the line of sight between landing aircraft 116 and M, line 118 represents the predetermined glide path, line 200 represents the projection of line 114 on the horizontal plane through M, $\phi$ represents the angle between lines 114 and 200, and $\delta$ represents the pitch angle.

In FIG. 2A, L represents the position of light source 106, line 202 represents a line parallel to the deck through L, line 204 represents the incident beam of light directed toward M from L, $\theta$ represents the light source angle between lines 202 and 204, line 206 represents a line parallel to the deck through M, line 208 represents the perpendicular to the deck through M, line 210 represents the vertical through M, and V represents the position of the virtual image of light source 106 as seen from landing aircraft 116.

In FIG. 2B, P represents the position of landing aircraft 116, I represents the fixed distance between I and M, line 212 represents a line parallel to the deck through I, line 110 represents the tracking line between P and I, $\alpha$ represents the elevation angle between tracking line 110 and line 212, $\gamma$ represents the fixed angle between $b$ and line 212, B represents the angle between tracking line 110 and line of sight 114, A represents the angle between line of sight 114 and predetermined glide path 118, $\epsilon$ represents the angle between $a$ and $\Delta h$, $\Delta x$ represents the horizontal component of $a$, line 214 represents the horizontal datum line through M' for $\Delta h$ equal to zero, line 216 represents the deck of aircraft carrier 100 for $\Delta h$ equal to zero, and $\phi'$ represents the glide angle between predetermined glide path 118 and line 216.

From consideration of FIG. 2A it can be shown that (1)
$$\mu = \frac{\phi + \delta - \theta}{2}$$

The pitch angle $\delta$ and the light source angle $\theta$ are both directly ascertainable, but $\phi$, the angle between line of sight line 114 and the horizontal projection thereof, is not directly ascertainable.

However, from consideration of FIG. 2B, it can be shown that (2)
$$\phi = \arctan \frac{a \cos (\phi' - \epsilon) \sin (\alpha - \delta) + b \sin (\alpha + \gamma) \sin \phi'}{a \cos (\phi' - \epsilon) \cos (\alpha - \delta) + b \sin (\alpha + \gamma) \cos \phi'}$$

Equation 2 can be simplified with insignificant error because the glide angle $\phi'$ is always made very small, never greater than 5°, in order to minimize the impact of a landing aircraft on the deck of an aircraft carrier. Furthermore angle $\epsilon$ is also small.

Therefore, (3) $a \cos (\phi' - \epsilon) \cong a \cos (-\epsilon) = a \cos \epsilon = \Delta h$ (4) $\sin \phi' \cong \phi'$ Substituting Equations 3 and 4 in Equation 2, (5)
$$\phi \cong \arctan \frac{\Delta h \sin (\alpha - \delta) + b \sin (\alpha + \gamma) \phi'}{\Delta h \cos (\alpha - \delta) + b \sin (\alpha + \gamma) \cos \phi'}$$

$\Delta h$, $\alpha$, $\delta$, $b$, $\gamma$ and $\phi'$ are all known or measurable quantities. Therefore, $\phi$ may be ascertained with insignificant error by solving Equation 5. After solving Equation 5, it is a simple matter to solve Equation 1 to obtain the tilt angle $\mu$.

Referring now to FIG. 3, there is shown a block diagram of a preferred embodiment of the invention. Tilt angle computer 302, which is shown in detail to FIG. 4, includes handwheel 304 for setting shaft input 306 to a position $\phi'$, corresponding to the value of glide angle, and, handwheel 308 for setting shaft input 310 to a position $-\theta$ corresponding to the value of the negative of the light source angle.

Infra-red tracker 312, shown in detail in FIG. 5, provides a first electrical output proportional to elevation angle $\alpha$ which is applied as an input to tilt angle computer over conductor 314, and a second electrical output proportional to $b \sin (\alpha + \gamma)$ which is applied as an input to tilt angle computer 302 over conductor 316.

Height change computer 318, shown in detail in FIG. 6, which has a first electrical input proportionate to roll angle $\lambda$ and a second electrical input proportional to pitch angle $\delta$ applied thereto from the ship's gyros over conductors 320 and 322, respectively, provides an electrical output proportional to $\Delta h$ which is applied as an input to tilt angle computer 302, over conductor 324.

An electrical input proportional to pitch angle $\delta$ from the ship's gyros is also directly applied as an input to tilt angle computer 302 over conductor 326.

Tilt angle computer 302, in response to the inputs applied thereto, solves Equations 5 and 1, discussed above, and produces an electrical output proportional to mirror tilt angle $\mu$, which is applied as an input to tilt angle servo system 328 over conductor 330.

In response to this input being applied thereto, tilt angle servo system 328 rotates output shaft 332 thereof, which is coupled to mirror and datum lights 102, to thereby tilt mirror and datum lights 102 through the angle $\mu$.

Referring now to FIG. 4, which is a detailed showing of tilt angle computer 302, pitch follow-up servo 402 is responsive to pitch information. More specifically, pitch angle $\delta$ information is transmitted at 2 and 36 times pitch angle from the ship's gyros by respective synchro transmitters associated therewith. The 2 times pitch angle information is applied as an input to control transformer 404 and the 36 times pitch angle information is applied as an input to control transformer 406.

The respective outputs of control transformers 404 and 406 are connected as respective inputs to crossover network 408. The output of crossover network 408 is applied as a first input to servo amplifier 410. The output of servo amplifier 410 energizes servo motor 412 of motor-generator set 414.

Servo motor 412 drives generator 416 and rotates shaft 418. The output of generator 416 is fed back as a second input to servo amplifier 410.

Shaft 418 is coupled through suitable reduction gearing 420 and shaft 422 to the rotor of control transformer 406. Shaft 422 is also coupled through 18/1 reduction gearing 424 and shaft 426 to the rotor of control transformer 404. Shaft 426 is also coupled through 2/1 reduction gearing 428 to shaft 430.

In response to the operation of servo motor 412, the rotors of control transformers 404 and 406 are driven to null positions, at which point servo motor 412 stops. At null, the angular position of shaft 430 relative to a reference position is equal to pitch angle $\delta$.

Elevation angle $\alpha$ information is transmitted by a synchro transmitter associated with infra-red tracker 312 and is applied as an input to differential synchro transmitter 432.

Since the rotor of differential synchro transmitter 432 is oriented at pitch angle $\delta$ relative to the stator thereof, the output therefrom, which is applied as an input to control transformer 434 of tracker servo 436 manifests in electrical form the value of $(\alpha - \delta)$.

In the manner described in connection with pitch follow-up servo 402, the servo loop of tracker servo 436 comprising servo amplifier 438, motor-generator set 440 and reduction gear 442, serves to drive control transformer 434 to null. At null, the angular position of shaft 444 relative to a reference position thereof is equal to $(\alpha - \delta)$.

Shaft 444 is used to rotate the rotor of resolver 446 to an angular position of $(\alpha - \delta)$ relative to the stator thereof.

A signal manifesting $\Delta h$, which is received from height change computer 318, is applied as an input to resolver 446. Therefore resolver 446 will produce a first output equal to $\Delta h \sin (\alpha - \delta)$, which is applied to a first input to summing network 448, and a second output equal to $\Delta h \cos (\alpha - \delta)$, which is applied as a first input to summing network 450.

A signal manifesting $b \sin (\alpha + \gamma)$ is transmitted from infra-red tracker 312, and is applied as an input to both linear potentiometer 452 and cosine potentiometer 454. The wipers of potentiometers are set at a position equal to glide angle $\phi'$ by handwheel 304 and shaft 306. Therefore, the output from linear potentiometer 452, which is applied as a second input to summing network 448, is equal to $b \sin (\alpha+\gamma)\phi'$ and the output from cosine potentiometer 454, which is applied as a second input to summing network 450, is equal to $b \sin (\alpha+\gamma) \cos \phi'$.

The outputs of summing networks 448 and 450 which are respectively equal to $\Delta h \sin (\alpha-\delta) + b \sin (\alpha+\gamma)\phi'$ and $\Delta h \cos (\alpha-\delta) + b \sin (\alpha+\gamma) \cos \phi'$ are applied as respective first and second inputs to resolver 456 of tangent servo 458. The output from resolver 456 is applied through a servo loop comprising servo amplifier 460, motor-generator set 462, reduction gear 464 and shaft 466, to drive the rotor of resolver 456, which is coupled to shaft 466, to a null position. At null the angular position of shaft 466 relative to a reference position is equal to $$\arctan \frac{\Delta h \sin (\alpha-\delta) + b \sin (\alpha+\gamma)\phi'}{\Delta h \cos (\alpha-\delta) + b \sin (\alpha+\gamma) \cos \phi'}$$

This, it will be seen from Equation 5, is equal to $\phi$.

Shaft 466 is connected as a first input to differential 468 and shaft 430, having an angular position equal to $\delta$ is connected as a second input to differential 468. Output shaft 470 of differential 468 therefore has an angular position relative to a reference position equal to $(\phi+\delta)$. Shaft 470 is connected as a first input to differential 472. $-\theta$, the negative of light source angle, is applied as a second input to differential 472 through handwheel 308 and shaft 310.

Therefore, the angular position of output shaft 474 relative to a reference position is equal to $(\phi+\delta-\theta)$. However, from Equation 1, $$\mu = \frac{\phi+\delta-\theta}{2}$$

Thus, the angular position of shaft 474 is equal to twice the mirror tilt angle $\mu$.

Shaft 474 is connected directly to the rotor of synchro transmitter 476 and through 1/18 step-up gear 478 to synchro transmitter 480.

The outputs from synchro transmitters 476 and 480, which manifest respectively 2 and 36 times the mirror tilt angle $\mu$, are applied as inputs to tilt angle servo system 328 of FIG. 3. In response to this input information, tilt angle servo system 328 is effective in tilting mirror and datum lights 102 of FIG. 3 through the mirror tilt angle $\mu$.

Referring now to FIG. 5, which is a detailed showing of infra-red tracker 312 of FIG. 3, infra-red sensing device 108 of FIG. 7 comprises a folded reflector optical system composed of reflectors 502 and 504 for focusing incident infra-red radiation on infra-red sensor 506 through reticle 508. Reticle 508 is rotated at a given fixed frequency by motor 510. Located near the reticle is an appropriately placed azimuth pickoff 512 and an appropriately placed elevation pickoff 514.

In response to the rotation of reticle 508 a signal is induced in azimuth pickoff 512 which has a frequency equal to that of reticle 508 and a phase determined by the position of azimuth pickoff 512. In a similar manner, a signal is induced in elevation pickoff 514 which has a frequency equal to that of reticle 508 and a phase determined by the position of elevation pickoff 514.

The signal from azimuth pickoff 512 is applied as a first input to azimuth phase discriminator 516 and the signal from elevation pickoff 514 is applied as a first input to elevation phase discriminator 518.

The output from infra-red sensor 506 is a signal having a frequency equal to that of reticle 508 and a phase determined by the orientation of infra-red sensing device 108 with respect to the direction of a landing aircraft. The signal from infra-red sensor 506 is amplified by amplifier 520 and applied as a second input to both azimuth and elevation phase discriminators 516 and 518.

Azimuth phase discriminator 516 produces an output which is proportional to the phase difference between the phase of the second input thereto from infra-red sensor 506 and the phase of the first input thereto from azimuth pickoff 512.

The output from azimuth phase discriminator 516 is applied to an azimuth servo loop comprising servo amplifier 522, motor generator set 524, reduction gear 526 and shaft 528. Shaft 528 is connected to infra-red sensing device 108, and serves to rotate infra-red sensing device 108 in azimuth about its center to a null point at which there is zero phase difference between the first and second inputs to azimuth phase discriminator 516.

In a similar manner, elevation phase discriminator 518 and the servo loop emanating therefrom comprising servo amplifier 530, motor-generator set 532, reduction gear 534, and shaft 536 serves to rotate infra-red sensing device 108 in elevation about its center to a null point at which there is zero phase difference between the first and second inputs to elevation phase discriminator 518.

When both azimuth and elevation phase discriminators 516 and 518 are at their null points, infra-red sensing device 108 points directly at the landing aircraft.

Coupled to elevation shaft 536 is synchro transmitter 538 for transmitting a signal manifesting elevation angle $\alpha$ to tilt angle computer 302 of FIG. 3.

Elevation shaft 536 is also coupled to the rotor of resolver 538. The rotor of resolver 538 is offset relative to the stator thereof by the fixed angle $\gamma$. An input voltage equal to $b$ (not shown) is connected as an input resolver 538. Therefore, resolver 538 produces an output equal to $b \sin (\alpha+\gamma)$, which is applied to tilt angle computer 302 of FIG. 3.

Referring now to FIG. 6, which is a detailed showing of height change computer 318 of FIG. 3, vertical accelerometer 602 is mounted in inner pitch gimbal 604 which is supported by roll gimbal 606 for vertical stabilization. Pitch gimbal 604 is controlled by pitch angle $\delta$ information transmitted thereto from a synchro transmitter associated with the ship's gyros. Roll gimbal 606 is controlled by roll angle $\lambda$ information transmitted thereto from a synchro transmitter also associated with the ship's gyros.

Associated with vertical accelerometer 602 is a torquer 608 and a pickoff 610. Pickoff 610 has an excitation signal applied thereto from 4000 c.p.s. source 612. In response to vertical acceleration, pickoff 610 produces a 4,000 c.p.s. signal having an amplitude proportional to the vertical acceleration which is applied as an input to amplifier 614. Amplifier 614, which has a second 4000 c.p.s. signal applied thereto as a reference signal directly from 4000 c.p.s. source 612, produces a D.C. voltage output having a magnitude proportional to the vertical acceleration.

The output of amplifier 614 is applied in series with torquer 608 as an input to first integrator 616, which comprises resistances 618 and 620, servo amplifier 622, servo motor 624, reduction gear 626, shaft 628, voltage divider 630 operated by shaft 628, and capacitance 632.

The output of first integrator 616, which is proportional to vertical velocity, is applied as an input to second integrator 634, which is composed of resistance 636, servo amplifier 638, servo motor 640, reduction gear 642, shaft 644, voltage divider 646 which is operated by shaft 644, and capacitance 648.

Shaft 644 also operates the wiper of A.C. voltage divider 650. The voltage at the wiper of voltage divider 650 is equal to the height change $\Delta h$, and is applied to tilt angle computer 302 of FIG. 3.

In order to maintain the accuracy of first and second integrators 616 and 634 over long periods of time both proportional and integral feedback loops are incorporated in height change computer 318.

More specifically, the A.C. output on the wiper of voltage divider 650, equal to $\Delta h$, is applied as a first input to differential network 652. An A.C. signal having an amplitude representing a height reference horizontal datum line is applied as a second input to differential network 652. The output from differential network 652, equal to the difference between the reference height and $\Delta h$, is applied to a proportional feedback network comprising demodulator 654, and is further applied to an integral feedback network comprising servo amplifier 656, motor-generator set 658, reduction gear 660, shaft 662, and voltage divider 664, which is operated by shaft 662.

The output from demodulator 654 is applied through series resistance 666 to load resistance 668, and the output from voltage divider 664 is applied through series resistance 670 to load resistance 668. The output across load resistance 668 is applied as a feedback input to first integrator 616 through resistance 672, and is applied as a feedback input to second integrator 634 through resistance 674.

Thus it will be seen that $\Delta h$ is equal to the double integral of the vertical acceleration measured by the vertically stabilized vertical accelerometer. In order to ensure that $\Delta h$ represents the true change in height experienced by mirror and datum lights 102 due to pitch, roll and heave, vertical accelerometer is mounted in close proximity to mirror and datum lights 102.

Although only a preferred embodiment of the invention has been described herein, it will be apparent there are modifications and changes which fall within the skill of the art. For instance, there are tracking methods other than infra-red, such as radio and radar, for example. Also other circuit arrangements than that shown may be used to solve Equations 1 and 5. It is, therefore, not intended that the invention be restricted to the preferred embodiment disclosed herein, but that it be limited only by the true spirit and scope of the appended claims.

We claim:

1. In a mirror landing system for landing an aircraft on the deck of a ship along a predetermined glide path, wherein said landing system includes a mirror and a source of light creating a virtual image in and reflected from said mirror, the center of said mirror and said source of light being fixed with respect to said deck; the combination therewith of automatic means for tilting said mirror about its center through an angle $\mu$ equal to $$\frac{\phi+\delta-\theta}{2}$$

wherein $\phi$ is the angle between a first line determined by the center of said mirror and an aircraft located on the glide path and the projection of the first line on a horizontal plane passing through the center of said mirror, $\delta$ is the pitch angle of said ship, and $\theta$ is the angle between a second line connecting said source of light and the center of said mirror and the projection of said second line in a plane parallel to said deck passing through said source of light, said automatic means including tracking means having a sensing device the center of which is fixed relative to said deck for determining the actual angle $\alpha$ between a third line connecting the center of said sensing device and said aircraft and the projection of said third line in a plane parallel to said deck and passing through the center of said sensing device.

2. The combination defined in claim 1, wherein said sensing device is response to infra-red radiation.

3. The combination defined in claim 1, wherein $$\phi=\arctan\frac{\Delta h \sin(\alpha-\delta)+b\sin(\alpha+\gamma)\phi'}{\Delta h \cos(\alpha-\delta)+b\sin(\alpha+\gamma)\cos\phi'}$$

where $\Delta h$ is the differential vertical distance between the actual position of the center of said mirror and the position the center of said mirror would have if the pitch, roll and heave of said ship were all zero, $b$ is the fixed distance between the centers of said sensing element and said mirror, $\gamma$ is the fixed angle between $b$ and the projection of $b$ in a plane parallel to said deck and passing through the center of said sensing device, and $\phi'$ is the angle between said predetermined glide path and the projection of said glide path in a horizontal plane; and wherein said automatic means further includes computer means coupled to said tracking means for producing an output manifesting the angle $\mu$ in response to a first input manifesting $\alpha$, a second input manifesting $\delta$, a third input manifesting $\theta$, a fourth input manifesting $\phi'$ and a fifth input manifesting $\Delta h$, and means responsive to the output of said computer means for tilting said mirror through an angle $\mu$.

4. The combination defined in claim 3, wherein said automatic means further includes a height change computer for determining $\Delta h$.

5. The combination defined in claim 4, wherein said height change computer includes a vertical stabilized vertical accelerometer, and integration means for determining the double integral of the output of said accelerometer, whereby the output from said integrating means manifests $\Delta h$.

References Cited in the file of this patent

UNITED STATES PATENTS

| 1,238,503 | Fiske et al. | Aug. 28, 1917 |
| 1,558,567 | Schein | Oct. 27, 1925 |
| 2,784,925 | Goodhart | Mar. 12, 1957 |

OTHER REFERENCES

Selsyn Drive Catalogue Bulletin 722, GEA, May 1929.